Feb. 18, 1930.　　　G. W. CRAIG　　　1,747,754
SPOT AND FLOOD LAMP
Filed June 27, 1928　　　2 Sheets-Sheet 1
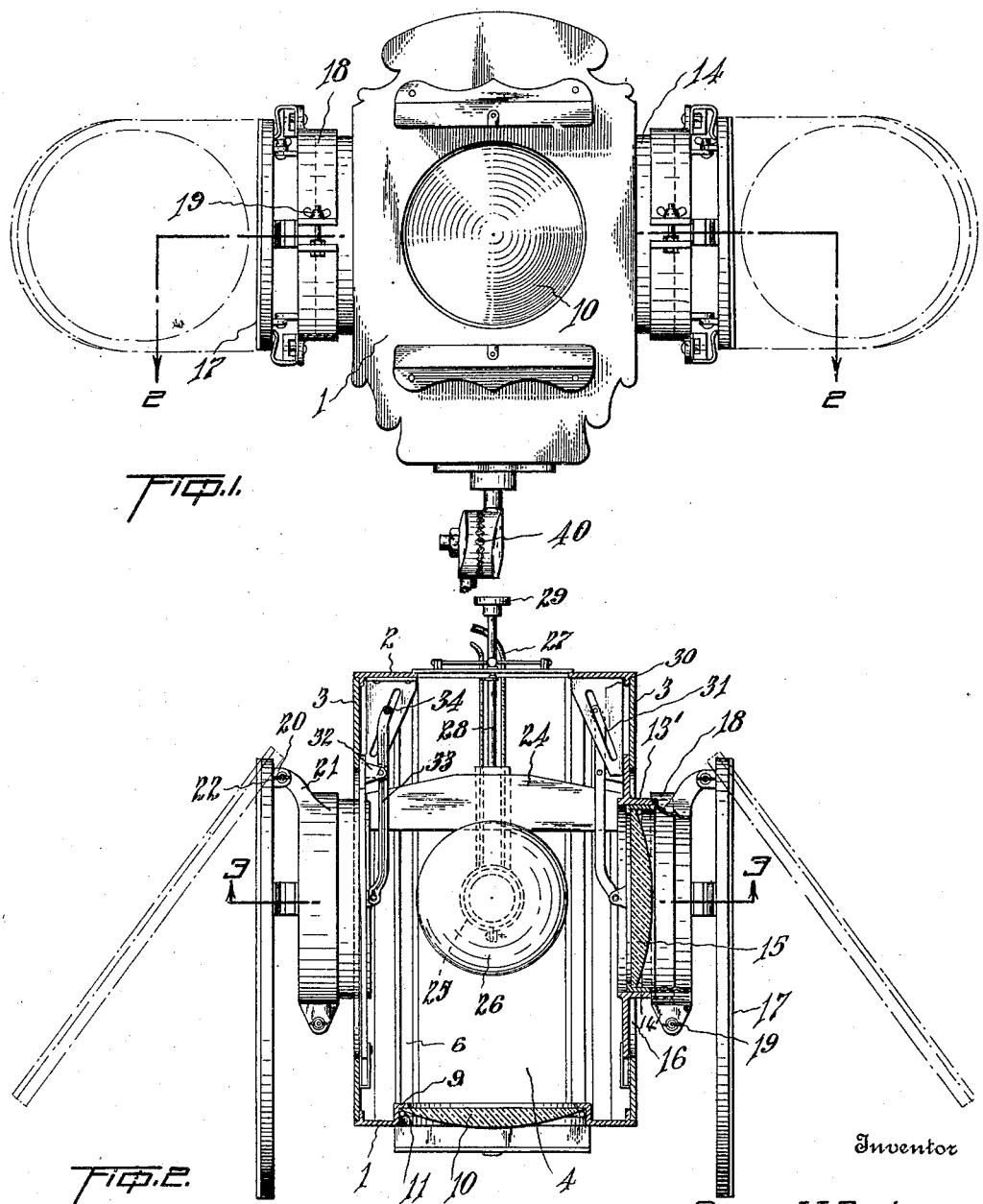
Inventor
George W. Craig Feb. 18, 1930.   G. W. CRAIG   1,747,754
SPOT AND FLOOD LAMP
Filed June 27, 1928   2 Sheets-Sheet 2

Inventor
George W. Craig
By [signature]
Attorney

Patented Feb. 18, 1930

1,747,754

UNITED STATES PATENT OFFICE

GEORGE W. CRAIG, OF DETROIT, MICHIGAN

SPOT AND FLOOD LAMP

Application filed June 27, 1928. Serial No. 288,664.

My invention pertains to a novel light projector of the type to be employed in the illumination of theatrical stages. In the course of the usual theatrical performance certain acts require that a certain spot on the stage be illuminated, and at other times it is necessary that two or three spots be illuminated simultaneously. It is also necessary at times that the entire stage be flooded with light.

With the object of satisfying these requirements, I have constructed a projector whereby a single beam or a series of beams may be projected upon the stage. The projector is constructed with a series of three lenses, two of which are at right angles to a front lens and which project their light forward by means of pivoted reflecting wings.

The device is also provided with an adjustment whereby the diameter of the beam may be determined and whereby any beam may be enlarged to a sufficient size to flood the entire stage with light. The combination of the light from all three lenses may be projected upon the one area and give a greater intensity of light by the mere focusing of the reflecting wings.

The manner in which I attain these objects is disclosed by way of example in the following specification with reference to the accompanying drawings in which—

Figure 1 is a front elevation of the light projector;

Fig. 2 is a cross section on the line 2—2 of Figure 1;

Figure 3:
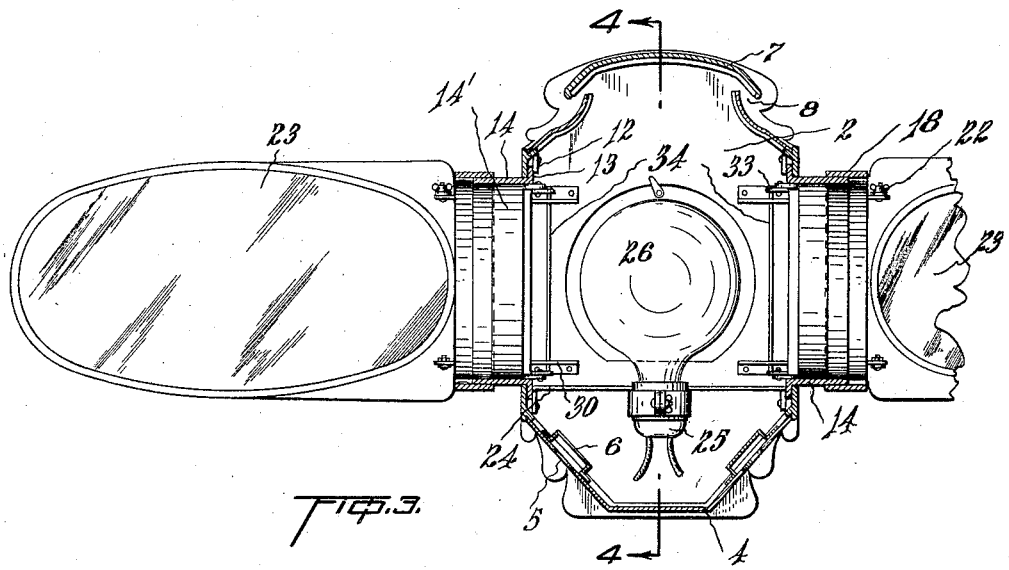
Fig. 3 is a cross section on the line 3—3 of Figure 2.
Figure 4:
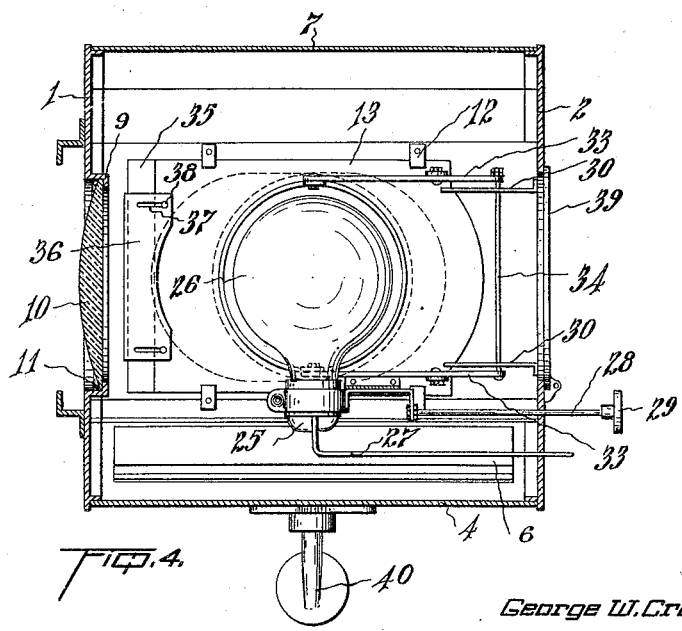
Fig. 4 is a cross section on the line 4—4 of Figure 3.

The light projector is formed in a casing having the front member 1 and the rear member 2 to which are attached the sides 3. The bottom 4 is provided with perforations 5 which are covered by baffles 6 to prevent a direct draft of cool air from striking the heated lighting means presently to be described. The top or cover 7 is broken as at 8 to permit circulation of air within the casing.

The front plate member 1 is constructed with an opening which is provided with a flange 9 in which is placed a lens 10 which is held by a retaining ring 11.

Attached to the sides 3 are brackets 12 in which sliding plates 13 are mounted. These plates are constructed with flanged openings 14 in which are supported rings 14' which retain the lenses 15. The flanges 13' of the plates extend outwardly through the openings 16 in the side members 3, a sufficient distance so that wings 17 may be mounted on these flanges by means of the bands 18. These bands surround the flanges 14 and are drawn tight thereon by means of the flanged nut and screw 19. The wings are constructed with pivot ears 20 which are pivoted to the lugs 21 of the bands 18. One of these pivotal connections on each wing is provided with a flanged nut and set screw 22 whereby the wings may be adjusted at any desired angle and locked. Attached on the face of the wings 17 are mirrors or reflectors 23 which in this case are of an elliptical form.

The sliding plates 13 mounted on the sides of the casing are connected by a transverse cross-member 24 which supports the electric light socket 25 in which is retained the bulb 26, the lead in wires 27 being in connection with said socket 25. This cross-member is provided with an operating stem 28 which extends outwardly through the rear member 2 and is provided with a handle 29.

Mounted on the sides 3 are brackets 30 which are provided with slots 31, angular to the sides 3 and rear member 2. The side plates 12 carry pivot ears 32 to which are pivoted the arms 33 which are connected by the cross rods 34. These cross rods 34 are adapted to pass through the slots 31 in the brackets 30. At their opposite ends the arms 33 are pivotally connected to the lens retaining rings 14'.

Plates 35 of sheet metal are positioned between the plates 13 and the sides 3, and are employed to cover the openings 16 when the plates 13 are receded. These plates 35 are moved into the covering position by means of a bracket 36 which is provided with slots 37 in which the pins 38 attached to the plates 13 cause the motion to be imparted.

To allow access to the interior of the projector, for removal of the light or for cleaning purposes a door 39 is provided in the rear member 2. The device is provided with a swivel member 40 by which the ray of light is directed.

The operation is briefly as follows. The light is focused upon the desired location, and the side wings are adjusted to project the light on the desired location, the diameter of the beams being uniform. When it is desired to reduce the diameter of the beams, the operating stem 28 is pulled outwardly by means of the handle 29. This movement causes the light 26 to be moved away from the front lens 10 and by means of the cross-member 24 the side lenses which are supported in the plates 13 are kept opposite the light.

This movement of the light away from the lens 10 causes a ray of smaller diameter to be cast upon the stage. This movement alone would cause a difference in the diameter of this front ray and the rays projected through the side lenses. It will be noted however that the brackets 30 having the angled slots 31 in which the cross rods 34 are allowed to slide, provide a means whereby the lenses 15 are moved a corresponding distance away from the light.

The arms 33 which are pivoted on the plates 13 are subject to any longitudinal movement of the plates 13. Therefore when the light is receded from the front lens 10 the cross rods 34 are caused to slide in the slots 31, and this movement towards the rear causes the ends of the arms having the cross rods 34 to be moved inwardly; and by means of the pivots 32 the lenses 15 are moved outwardly a corresponding distance.

It is therefore possible by the manipulation of the handle 29 to regulate the diameter of the three beams, and by moving the light close to the front lens the side lenses are also drawn in close and the entire stage may be flooded with light.

Although a specific embodiment of my invention has been shown and described it is to be understood that such alterations in the details of construction may be made as fall within the scope of the appended claims.

What I claim is:—

1. In a light projector, a casing having a lens mounted in the front wall thereof, a light slidably mounted within said casing, means for sliding said light, lenses slidably mounted in the side walls of said casing and linked to said means for actuation thereby; pivoted wings mounted adjacent two of said lenses and adapted to slide with said side lenses, and reflecting mirrors attached to said wings for deflecting the light rays passed through the said lenses.

2. In a light projector, a casing, a light in said casing, lenses in front and two sides of said casing, an operating stem for moving said light in relation to said front lens, means for moving the side lenses a corresponding distance from said light, pivoted reflectors attached adjacent said side lenses for deflecting the rays passing through the side lenses.

3. In a light projector, a casing, a light in said casing, lenses in the front and two sides of said casing, an operating stem for moving said light in relation to the front lens, a connection whereby the side lenses are moved an equal distance with said light, and connections whereby the movement of the light away from the front lens causes the side lenses to be moved a corresponding distance away from the light.

4. In a light projector, a casing, a light in said casing, lenses in the front and two sides of said casing, an operating stem for moving said light in relation to the front lens, a connection whereby the side lenses are moved an equal distance with said light, connections whereby the movement of the light away from the front lens causes the side lenses to be moved a corresponding distance away from the light, side wings attached adjacent said side lenses and subject to movement therewith, and reflecting surfaces attached to said side wings.

5. In a light projector, a casing, a lens retained in the front wall of said casing, sliding lens retaining plates retained on two sides of said casing, connecting means between said sliding plates, a light mounted on said connecting means, an operating stem attached to said connecting means whereby said lenses and light are moved in conjunction, and means whereby movement of the light in relation to the front lens causes the side lenses to be moved a corresponding distance within the said sliding plates from the said light.

6. In a light projector, a casing, a lens retained in the front wall of said casing, sliding lens retaining plates retained on two sides of said casing, connecting means between said sliding plates, a light mounted on said connecting means, an operating stem attached to said connecting means whereby said lenses and light are moved in conjunction, means whereby movement of the light in relation to the front lens causes the side lenses to be moved a corresponding distance within the said sliding plates from the said light, side wings attached adjacent said side lenses and subject to movement therewith, and reflecting surfaces attached to said side wings.

7. In a light projector, a casing, a forward lens and slidable lateral lenses in said casing, a lamp slidably mounted in said casing, means for retracting said lamp and lateral lenses from said forward lens, and means for simultaneously adjusting said lateral lenses laterally with respect to said lamp.

In testimony whereof I affix my signature.

GEORGE W. CRAIG.